(12) United States Patent
Castel et al.

(10) Patent No.: US 6,170,385 B1
(45) Date of Patent: Jan. 9, 2001

(54) BRAKE BOOSTER

(75) Inventors: Philippe Castel, Paris; Daniel Lordier, Deuil la Barre; Raymond R. Ombredane, Stains; Frederic C. Degorce, Bretigny sur Orge, all of (FR)

(73) Assignee: Delphi Technologies, Inc., Troy, MI (US)

( * ) Notice: Under 35 U.S.C. 154(b), the term of this patent shall be extended for 0 days.

(21) Appl. No.: 09/201,405

(22) Filed: Nov. 30, 1998

(30) Foreign Application Priority Data

Dec. 10, 1997 (GB) .................................................. 9726036

(51) Int. Cl.$^7$ ...................................................... F01B 19/00
(52) U.S. Cl. ............................................. 92/48; 91/376 R
(58) Field of Search ........................ 92/48, 49; 91/369.1, 91/376 R, 533

(56) References Cited

U.S. PATENT DOCUMENTS

| 4,377,966 | * | 3/1983 | Parker et al. ............................. 92/48 |
| 5,261,312 | | 11/1993 | Bornemann et al. ................... 91/376 |
| 5,878,650 | * | 3/1999 | Osterday et al. ......................... 92/48 |

FOREIGN PATENT DOCUMENTS

| 2918911 | 12/1980 | (DE) . |
| 3114235 | 6/1982 | (DE) . |
| 4116779 | 11/1992 | (DE) . |
| 0233026 | 8/1987 | (EP) . |
| 823722 | 11/1959 | (GB) . |
| 1127626 | 9/1965 | (GB) . |
| 1245126 | 8/1968 | (GB) . |

* cited by examiner

Primary Examiner—Hoang Nguyen
(74) Attorney, Agent, or Firm—Robert M. Sigler

(57) ABSTRACT

A brake booster (10) comprising a housing (12); a diaphragm (16,18) mounted within the housing to define front and rear chambers (30–36) within the housing; and a cylindrical component (38) mounted within the housing and having an end (42) which passes through a sealing aperture (40) during installation within the housing to make a seal with the cylindrical component; wherein the cylindrical component has a plurality of fingers (46) extending away the said end, the fingers being circumferentially spaced apart around the end, and the outer surface (48) of each finger being chamfered such that the free ends (50) of each finger lie on a circle having an outer diameter ($D_1$) which is less than the inner diameter ($D_2$) of the sealing aperture prior to installation. Easier installation of the cylindrical component during booster assembly, especially where blind installation is required.

7 Claims, 2 Drawing Sheets

BRAKE BOOSTER

TECHNICAL FIELD

The present invention relates to a brake booster or servomotor for use in the braking system of a motor vehicle.

BACKGROUND OF THE INVENTION

The use of a brake booster in the braking system of a motor vehicle is well known. The brake booster typically comprises a front and rear housing parts which are joined together around an outer peripheral edge; a flexible diaphragm secured inside the housing to define front and rear chambers within the housing; and a piston movable along its axis relative to the housing. At one or more positions within the booster, a cylindrical component of the booster has to pass though a seal during assembly of the booster; for example, the piston passing through an internally mounted seal, or an air passage tube extending through a sealing aperture in the diaphragm. In general, such a cylindrical component has an external diameter which is greater than the internal diameter of the seal prior to assembly. This can make installation of the cylindrical component through the seal difficult, especially where the assembler is unable to clearly see the installation during assembly (that is, during blind installation).

SUMMARY OF THE INVENTION

It is an object of the present invention to provide a cylindrical component for a brake booster which is easier to install through a seal, especially during blind installation.

A brake booster in accordance with the present invention for the braking system of a motor vehicle comprises a housing; a diaphragm mounted within the housing to define front and rear chambers within the housing; and a cylindrical component mounted within the housing and having an end which passes through a sealing aperture during installation within the housing to make a seal with the cylindrical component; wherein the cylindrical component has a plurality of fingers extending away the said end, the fingers being circumferentially spaced apart around the end, and the outer surface of each finger being chamfered such that the free ends of each finger lie on a circle having an outer diameter which is less than the inner diameter of the sealing aperture prior to installation.

For the sake of clarity, by chamfered outer surfaces is meant that the outer surfaces of the fingers have a gradually reducing diameter from the said end of the cylindrical component to the free ends of the fingers. The chamfered outer surfaces may be flat or curved.

The presence of the fingers allows easier installation of the cylindrical component, especially where blind installation is required.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
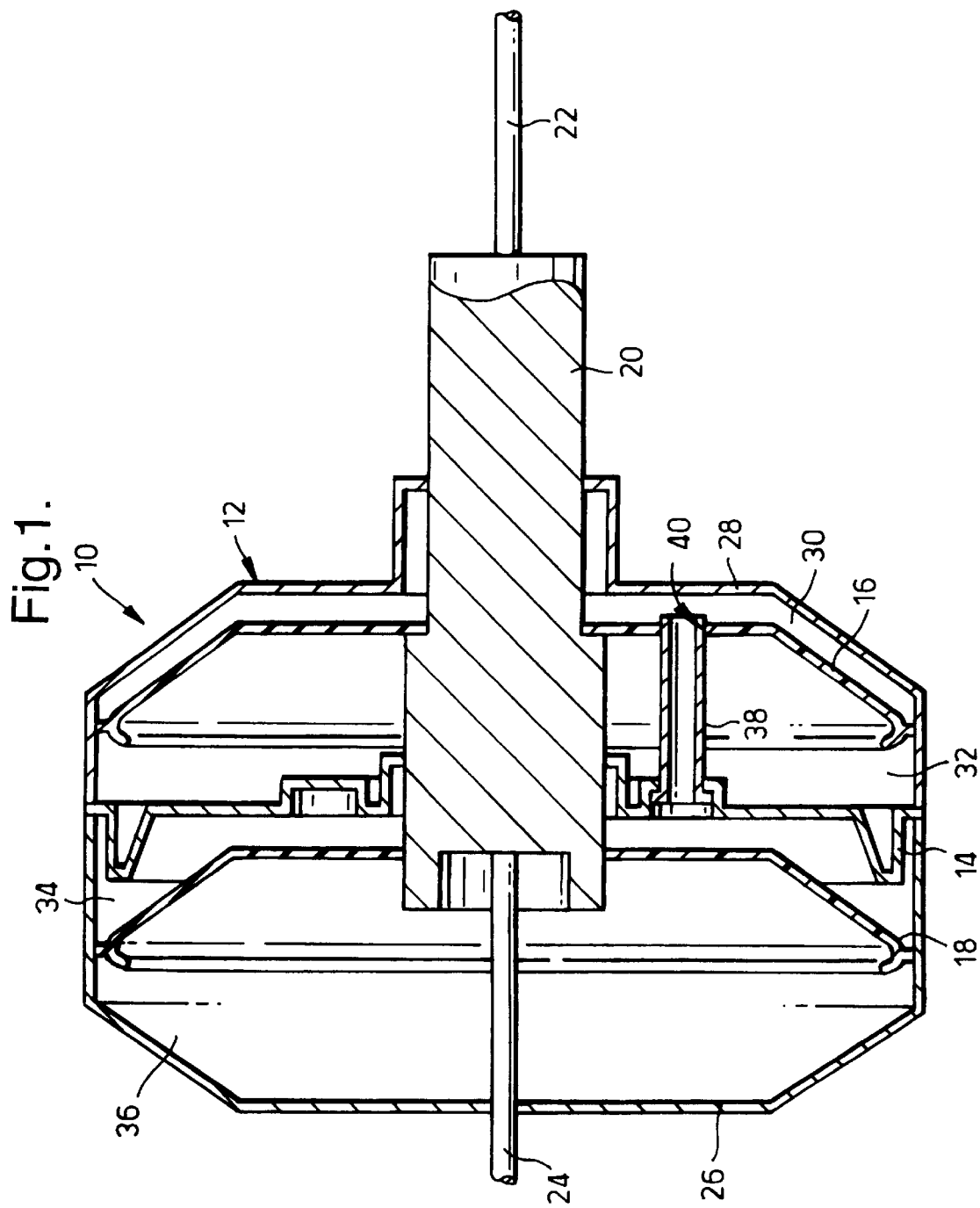
FIG. 1 is cross-sectional view of a brake booster in accordance with the present invention.

Referring to FIG. 1, the brake booster 10 is a tandem brake booster comprising a housing 12, an internal wall 14, first and second elastomeric diaphragms 16,18, respectively, a piston 20, a push rod 22, and an actuating rod 24. The diaphragms 16,18 are normally support by a rigid support member (not shown). The housing 12 comprises a front wall 26 and a rear wall 28. The diaphragms 16,18 and the internal wall 14 define first, second, third and fourth chambers 30,32,34,36, respectively, within the housing 12. The piston 20 can reciprocate in an axial direction relative to the housing 12. The push rod 22 is connectable to the brake pedal (not shown) of the motor vehicle. The actuating rod 24 is connectable to a piston of a master cylinder (not shown) of the braking system of the motor vehicle. The second and fourth chambers 32,36 are connectable to a vacuum source. A cylindrical air tube 38 is secured in the internal wall 14 and extends through a sealing aperture 40 in the first diaphragm 16 to provide an air passage between the first and third chambers 30,34. The first and third chambers 30,34 are connectable to air at atmospheric pressure or a source of pressurised air. The brake booster 10 as thus far described, and its operation, is known to those skilled in the art and will not be described in further detail.

Figure 2:
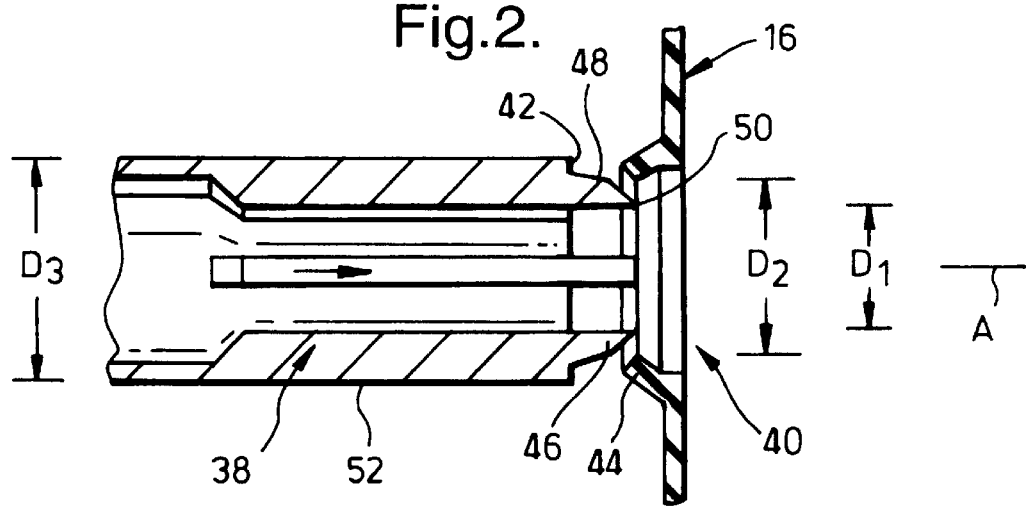
FIG. 2 is a cross-sectional view of the air tube and first diaphragm of the brake booster of FIG. 1 prior to installation of the air tube through the sealing aperture in the diaphragm.
Figure 3:
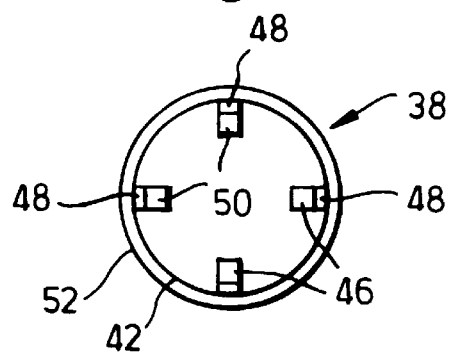
FIG. 3 is an end view of the air tube of FIG. 2.

During assembly of the brake booster 10, it is necessary for the assembler to pass one end 42 (FIGS. 2 and 3) of the air tube 38 through the sealing aperture 40 in the first diaphragm 16. As the normal outer diameter $D_3$ of the air tube 38 (taken through the longitudinal axis A of the air tube) is greater than inner diameter $D_2$ of the sealing lip 44 at the sealing aperture 40 prior to installation, and as the assembler cannot clearly see the sealing aperture during this installation, such an installation step can be difficult. In accordance with the present invention, the end 42 of the air tube 38 which passes through the sealing aperture 40 has a number of fingers 46. The fingers 46 extend away from the end 42 of the air tube 38 and are circumferentially spaced apart around the end. The outer surface 48 of each finger 46 is chamfered such that the free ends 50 of each finger 46 lie on a circle having an outer diameter $D_1$ which is less than the inner diameter $D_2$ of the sealing lip 44 of the sealing aperture 40 prior to installation. With this arrangement, during installation (in the direction of the arrow in FIG. 2), the free ends 50 of the fingers 46 pass through the sealing aperture 40 and the sealing lip 44 slides along the outer surface 48 and on to the outer surface 52 of the air tube 38 to provide a seal between the air tube and the first diaphragm 16. The present invention therefore allows easier installation of the air tube 38 in the sealing aperture 40.

Figure 4:
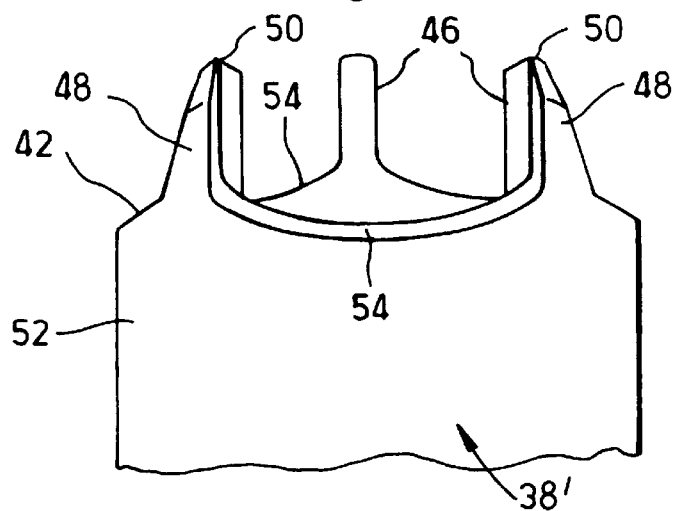
FIG. 4 is a side view of a modified air tube.

The fingers 46 are preferably integrally formed with the air tube 38. The number of fingers 46 and their circumferential spacing is predetermined to provide easy installation of the air tube 38 through the sealing aperture 40, that is, smooth sliding of the sealing lip 44 over the fingers 46 and on to the outer surface 52 of the air tube 38. Smooth sliding of the sealing lip 44 on to the outer surface 52 can be enhanced by the modified air tube 38' shown in FIG. 4. In this case, the air tube 38' has three fingers 46 each with a chamfered outer surface 48. Also, the edges 54 of the end 42 of the air tube 38' between the fingers 46 are chamfered and curved (concave).

The chamfered outer surfaces 48 are shown as being flat. It will be appreciated that the chamfered outer surfaces may be curved (convex). In other words, the outer surfaces 48 of the fingers 46 have a gradually reducing diameter from the end 42 of the air tube 38 to the free ends 50 of the fingers, the diameter being taken through the longitudinal axis A of the air tube.

The present invention can also be used with other cylindrical components of a brake booster where it is a requirement that the cylindrical component is installed through a seal during assembly of the brake booster. Examples of such other cylindrical components include installation of the piston 20 through an annular seal on the internal wall 14; installation of a sleeve around a tie rod where the tie rod and sleeve extend through a sealing aperture in a diaphragm; and installation of a pressure sensor which is mounted on the front wall 26 of the housing 12 and extends through a sealing aperture in the second diaphragm 18 to the third chamber 34. In each of these examples, the end of the piston, the end of the sleeve, or the end of the pressure sensor which are installed through the seal or sealing aperture can have fingers which are shaped and sized as described above with respect to the air tube 38.

The present invention is not restricted to tandem brake boosters, and can be used for installation of any cylindrical component of any type of brake booster where the cylindrical component is installed in a seal or sealing aperture.

The cylindrical component may have any suitable cross-sectional shape, and the present invention is not restricted to cylindrical components having a circular cross-section.

What is claimed is:

1. A brake booster for the braking system of a motor vehicle comprising a housing; a diaphragm mounted within the housing to define front and rear chambers within the housing; and a cylindrical component mounted within the housing and having an end which passes through a sealing aperture during installation within the housing to make a seal with the cylindrical component; wherein the cylindrical component has a plurality of fingers extending away the said end, the fingers being circumferentially spaced apart around the end, and the outer surface of each finger being chamfered such that the free ends of each finger lie on a circle having an outer diameter which is less than the inner diameter of the sealing aperture prior to installation.

2. A brake booster as claimed in claim 1, wherein the fingers are integrally formed with the cylindrical component.

3. A brake booster as claimed in claim 1 or claim 2, wherein the edges of said end of the cylindrical component between the fingers is chamfered and concave.

4. A brake booster as claimed in any one of claims 1 to 3, wherein the cylindrical component comprises an air tube which extends through the diaphragm, with the sealing aperture being formed in the diaphragm.

5. A brake booster as claimed in any one of claims 1 to 3, wherein the cylindrical component comprises a sleeve which is positioned around a tie rod which extends through the diaphragm, with the sealing aperture being formed in the diaphragm.

6. A brake booster as claimed in any one of claims 1 to 3, wherein the cylindrical component comprises a pressure sensor which is mounted on the housing and which extends through the diaphragm, with the sealing aperture being formed in the diaphragm.

7. A brake booster as claimed in any one of claims 1 to 3, wherein the cylindrical component comprises a piston which is reciprocally mounted within the housing and extends through an annular seal, the sealing aperture being defined by the annular seal.

* * * * *